US010691477B2

United States Patent
Kaul

(10) Patent No.: US 10,691,477 B2
(45) Date of Patent: Jun. 23, 2020

(54) VIRTUAL MACHINE LIVE MIGRATION USING INTELLIGENT ORDER OF PAGES TO TRANSFER

(71) Applicant: Red Hat Israel, Ltd., Raanana (IL)

(72) Inventor: Yaniv Kaul, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 309 days.

(21) Appl. No.: 15/276,885

(22) Filed: Sep. 27, 2016

(65) Prior Publication Data

US 2018/0088975 A1 Mar. 29, 2018

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ...... G06F 9/45558; G06F 3/061; G06F 3/064; G06F 3/0647; G06F 3/0664; G06F 3/067; G06F 2009/4557; G06F 2009/45583; G06F 2009/45595
See application file for complete search history.

(56) References Cited

U.S. PATENT DOCUMENTS

| 8,468,288 | B2 | 6/2013 | Corry et al. | |
|---|---|---|---|---|
| 8,984,240 | B2 | 3/2015 | Aslot et al. | |
| 9,032,398 | B2* | 5/2015 | Ahmad | G06F 12/10 711/105 |
| 9,063,866 | B1 | 6/2015 | Tati et al. | |
| 9,823,842 | B2* | 11/2017 | Gopalan | G06F 11/1453 |
| 2003/0177325 | A1* | 9/2003 | Jann | G06F 12/0284 711/165 |
| 2008/0059726 | A1* | 3/2008 | Rozas | G06F 21/53 711/156 |
| 2011/0314345 | A1* | 12/2011 | Stern | G06F 11/3466 714/47.1 |

(Continued)

OTHER PUBLICATIONS

Park et al. Fast and Space-Efficient Virtual Machine Checkpointing. [online] (2011). ACM., pp. 75-85. Retrieved From the Internet <https://csap.snu.ac.kr/sites/default/files/papers/2011.VEE_.Park_.Fast%20and%20space-efficient%20virtual%20machine%20checkpointing.pdf> (Year: 2011).*

*Primary Examiner* — Emerson C Puente
*Assistant Examiner* — Jonathan R Labud
(74) *Attorney, Agent, or Firm* — Lowenstein Sandler LLP

(57) ABSTRACT

An example method for virtual machine (VM) live migration using intelligent order of pages to transfer includes receiving a request to live migrate a VM, transferring memory pages of the VM that are identified as at least one of read-only or executable in a first iteration of VM memory page transfer of the live migration, transferring, as part of a second iteration of the transfer, prioritized memory pages of the VM that have not been transferred as part of the first iteration, and transferring, as part of a third iteration of the transfer, other memory pages of the VM that have not been transferred as part of the first and second iterations and that are not identified as ignored memory pages of the VM, wherein the other memory pages of the VM comprise de-prioritized memory pages of the VM that are transferred last in the third iteration.

17 Claims, 5 Drawing Sheets

(56) References Cited

U.S. PATENT DOCUMENTS

| | | | | |
|---|---|---|---|---|
| 2014/0068207 A1* | 3/2014 | Aslot | .................. | G06F 12/12 |
| | | | | 711/160 |
| 2014/0215459 A1* | 7/2014 | Tsirkin | ................ | G06F 9/45558 |
| | | | | 718/1 |
| 2015/0052323 A1* | 2/2015 | Noel | .................. | G06F 12/00 |
| | | | | 711/162 |
| 2015/0149687 A1 | 5/2015 | Tsirkin et al. | | |

* cited by examiner

VIRTUAL MACHINE LIVE MIGRATION USING INTELLIGENT ORDER OF PAGES TO TRANSFER

TECHNICAL FIELD

The disclosure is generally related to network devices, and is more specifically related to virtual machine live migration using intelligent order of pages to transfer.

BACKGROUND

A virtual machine (VM) is a portion of software that, when executed on hardware of a host computer system (also referred to as "host" or "host machine"), creates an environment allowing the virtualization of the host computer system. Virtualization permits multiplexing of the hardware of the underlying host computer between different VMs. The host computer system allocates a certain amount of its resources to each of the VMs. Each VM then can use the allocated resources to execute applications, including operating systems (referred to as guest operating systems (OS)). A software layer providing the virtualization may be referred to as a hypervisor, a virtual machine monitor (VMM), or a kernel-based hypervisor, to name a few examples. The hypervisor emulates the underlying hardware of the host computer system, making the use of the VM transparent to the guest OS and the user of the VM. A VM may have a virtual processor, virtual system memory, virtual storage, and various virtual devices. VMs may be migrated between a source host computing platform ("the source host") and a destination host computing platform ("the destination host") connected over a network, which may be a local-area network or a wide area-network that may include the Internet.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
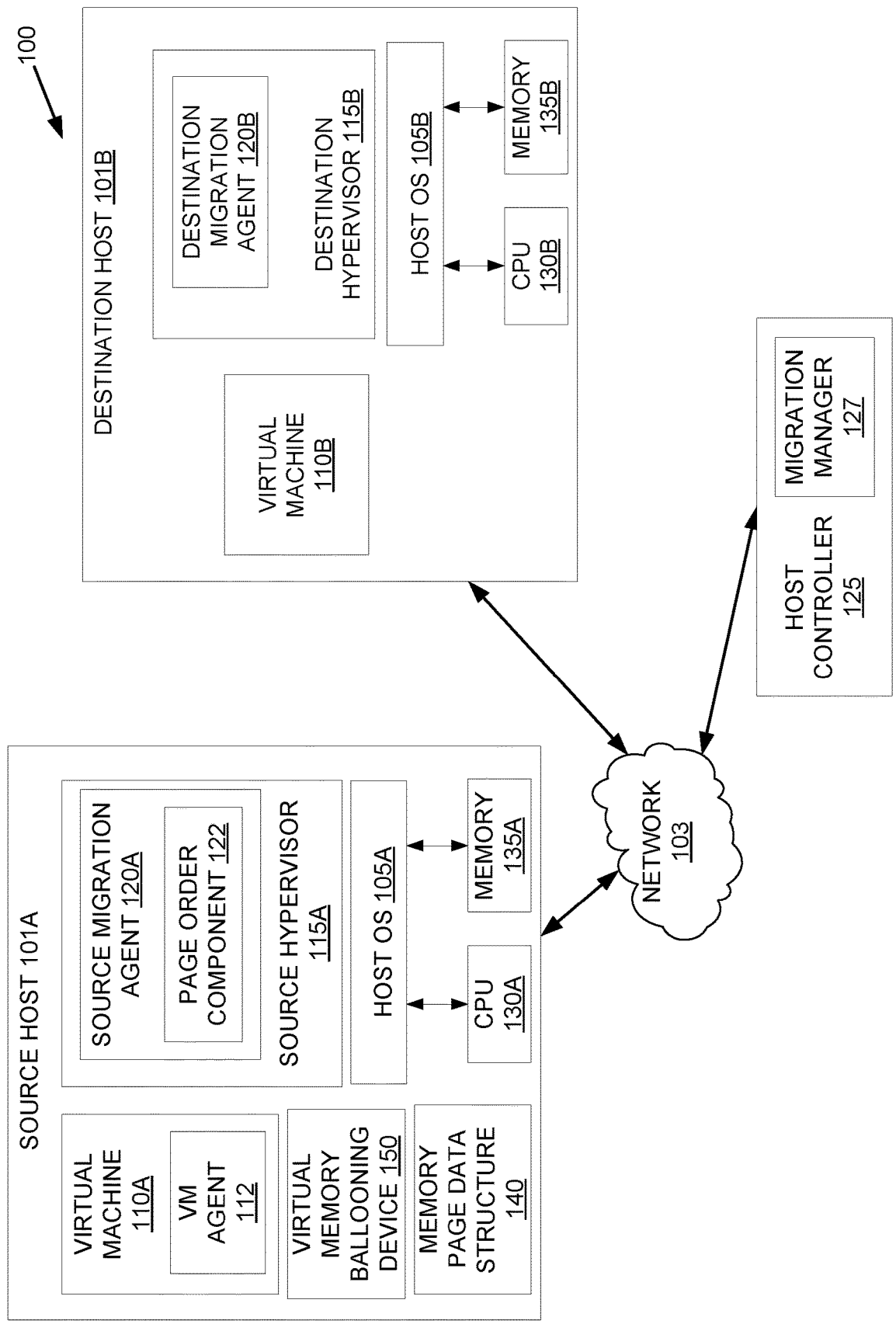
FIG. 1 depicts a block diagram of an example virtualization architecture for virtual machine live migration using intelligent order of pages to transfer in accordance with one or more aspects of the disclosure.

Described herein are methods and systems for virtual machine (VM) live migration using intelligent order of pages to transfer. One approach for migration of a VM from a source host machine (also referred to as "source" or "source host") to a destination host machine (also referred to as "destination" or "destination host") over a network is to permit a running source VM to continue to run during the migration process, which is referred to as live migration. Live migration typically permits a running VM to be moved between different physical machines without disconnecting a running client or application program. For a successful live migration, memory, storage, and network connectivity of the VM should be migrated from the source host machine to the destination host machine.

During VM live migration, the hypervisor copies the VM memory pages (also referred to as "memory pages" or "pages") from source to destination while the VM is still running on the source. While the memory copy of the live migration is occurring, pages that were transferred may be re-written ("dirtied") by applications executing on the VM. If some memory pages change during the live migration process, they may be re-copied until the rate of re-copied pages is not less than the page-dirtying rate. VM live migration does not always succeed, as the order of the pages transferred can be a naïve linear process (e.g., from first to last). When the migration process is restarted, it does not know which pages were re-written so it discards the copied pages and starts from the beginning. As a result, VM live migration can be a very slow and resource-intensive process.

Implementations of the disclosure increase the speed and efficiency of the VM live migration process by utilizing an intelligent order for pages being transferred. A page order component of a migration agent of a hypervisor manages transfer of memory pages of the VM as part of a live migration of the VM. The page order component first identifies read-only and/or executable memory pages of the VM. The page order component then transfers those read-only and/or executable memory pages first during the live migration. Subsequently, the page order component may utilize provided indications regarding the memory pages of the VM to further inform an order of remaining memory pages to be transferred. A VM agent of the VM may provide the indications to the page order components.

The indications from the VM agent may include which memory pages of the VM are good candidates for transfer (e.g., likely contain static data) and which memory pages of the VM are not good candidate for transfer (e.g., likely contain dynamic data). The page order components may transfer the pages indicated as good candidates prior to transferring the pages indicated as not good candidates as part of the live migration. In addition, the VM agent provides additional indications to the page order component regarding which memory pages of the VM can be ignored altogether in the VM memory page transfer portion of the live migration. For example, the VM agent may assist in optimizing the VM memory page transfer of the live migration by freeing memory pages (e.g., from ownership/use by the VM) by implementing virtual memory ballooning in the VM and cache optimization in the VM (and thus allowing the page order component to ignore those freed pages).

In conventional virtualization systems, solutions are provided to transfer VM memory as part of live migration by utilizing a straight-forward first to last (e.g., naïve) ordering of VM memory pages. However, the conventional systems do not provide a way to intelligently-order VM memory pages for transfer during the live migration of the VM based on characteristics of the memory pages (such as read-only/executable) and based on indications provided by a VM agent regarding status (good candidate, ignore, etc.) of the memory pages. Implementations of the disclosure overcome the noted drawbacks of the conventional virtualization systems by intelligently-ordering memory pages of the VM for transfer in a live migration of the VM, leaving a smaller amount of potentially changing (re-written) pages to be transferred. This reduces the time in which pages may get re-written during the live migration process, thus enhancing the chances for a fast and successful completion of the live migration of the VM. This also provides a smoother experience (e.g., less downtime of the VM) to a user of the VM while the live migration process occurs as the non-changing pages have no effect on the VM performance when transferred. Furthermore, implementations of the disclosure provide a technical advantage by reducing processing resources, processing time, and network bandwidth utilized to perform a live migration of a VM.

FIG. 1 illustrates sample virtualization architecture 100 in which implementations may operate. The virtualization architecture 100 may include a source host computer system 101a (the "source host 101a") and a destination host computer system 101b (the "destination host 101b"), each connected to a network 103. The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The source host 101a and destination host 101b may be one or more computing devices including, but not limited to, a server, a rackmount server, a router computer, a server computer, a mainframe computer, a workstation, a personal computer (PC), a desktop computer, a mobile phone, a smart phone, a mobile computing device, a personal digital assistant (PDA), tablet, laptop computer, thin client, etc. The source host 101a and the destination host 101b can include hardware components, such as one or more physical central processing units (CPUs) 130a-130b (also referred to as "processors" or processing devices"), memory (such as random access memory (RAM)) 135a-135b, input/output (I/O) devices (not shown), and other hardware components, which may all be communicably coupled via a system bus (not shown).

"Processor" or "CPU" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). As mentioned above, a processor may also be referred to as a CPU. "Memory" or "memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In one implementation, source host machine 101a and destination host machine 101b may be part of a virtualization system. Virtualization may be viewed as abstraction of some physical components into logical objects in order to allow running of various modules, for example, multiple operating systems, concurrently and in isolation from other modules, on one or more interconnected physical computer systems. Virtualization allows, for example, consolidating multiple physical servers into one physical server running multiple VMs in order to enhance the hardware utilization rate.

Source host 101a can include one or more VMs (including VM 110a to be migrated) and can run an operating system 105 ("host OS") to manage its resources. Each VM 110a can run a guest OS (not shown). In one implementation, the source host 101a executes a source hypervisor 115a to virtualize access to the underlying source host hardware components (e.g., CPU 130a, memory 135a), making the use of VM 110a transparent to the guest OS running on VM 110a and to users (e.g., a system administrator) of the source host 101a. Source hypervisor 115a may abstract the physical layer (i.e., hardware components) of source host 101a, including CPU 130a, memory 135a, and I/O devices, and present this abstraction to VM 110a as virtual devices. Device virtualization may be implemented by intercepting virtual machine memory read/write and/or input/output (I/O) operations with respect to certain memory and/or I/O port ranges, and by routing hardware interrupts to a VM 110a associated with the corresponding virtual device. Source hypervisor 115a may provide interfaces between the underlying hardware and virtual devices of VMs 110a. VM 110a may execute a guest OS (not shown) which may utilize underlying virtual processors (also referred to as virtual central processing units (vCPUs)), virtual memory, and virtual I/O devices. One or more applications may be executing on VM 110a under the guest OS.

In one implementation, a source migration agent 120a of the source hypervisor 122a may provide for live migration of the VM 110a from the source host 101a to a destination host 101b. Destination host 101b may include similar components as source host 101a, such as CPU 130b, memory 135b, and host OS 105b. Furthermore, similar to source host 101a, destination host 101b can execute an OS 105b ("host OS") to manage its resources. Destination host 101b may also execute a hypervisor (destination hypervisor 115b) similar to source hypervisor 115a of source host 101a. Destination hypervisor 115b may virtualize access to the underlying destination host hardware components.

As discussed above, live migration may refer to the process of moving a running VM 110a between different physical machines without disconnecting the VM 110a. For a successful live migration, memory, storage, and network connectivity of the VM 110a should be migrated from the source host 101a to the destination host 101b. When the live migration of VM 110a from source host 101a to destination host 101b is completed, the source VM 110a runs as destination VM 110b on destination host 101b.

In one implementation, the source hypervisor 115a may include a source migration agent 120a and the destination hypervisor 115b may include a corresponding destination migration agent 120b. The migration agent 120a, 120b can receive migration instructions from a host controller 125. Migration agent 120a, 120b can also make migration decisions. Although shown as discrete components of the hypervisors 115a-115b, the migration agents 120a-120b may be separate components coupled to hypervisors 115a-115b.

In one implementation, the host machines 101a-101b may be communicably coupled to a host controller 125 via network 103. The host controller 125 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The host controller 125 may reside on a designated computer device(s) or be part of the host machines 101a, 101b, or another machine.

Host controller 125 may include a migration manager 127 that can manage VM migration by issuing instructions to migration agents 120a and 120b on hypervisors 115a, 115b. The migration manager 127 on host controller 125 and migration agents 120a, 120b can work together to manage migrations, including determining a destination host machine 101b, initiating and scheduling migration, detecting and managing migration failures, and so on.

To initiate a migration, such as a live migration, the migration agent 120a of the source hypervisor 115a can receive a request from the migration manager 127 of the host controller 125 to migrate VM 110a from the source host 101a to the destination host 101b. In one implementation, the host controller 125 can issue the migration request after a triggering event (e.g., a system administrator's migration request, system conditions, such as resource utilization by source host exceeding a threshold, etc.).

Source migration agent 120a can begin the live migration of the VM 110a on source host 101a by directing memory of the VM 110a to be copied to the destination host 101b. Implementations of the disclosure provide a page order component 122 of the source migration agent 120a to increase the speed of the VM 110a live migration memory page transfer by utilizing an intelligent ordering of memory pages to transfer. The page order component 122 first accesses a memory page data structure 140 of the source host 101a. The memory page data structure 140 may be part of already-existing page data stores maintained by the source host 101a or the host OS 105a, or may be a separate data structure maintained by the source host 101a. The memory page data structure 150 may identify memory pages of the VM 110a and indicate whether those pages are read-only pages and/or executable pages.

As part of a first iteration of memory page transfer of the VM 110a during the live migration, the page order component 122 may access the memory page data structure 140 to identify the memory pages of the VM 110a that are read-only and/or executable memory pages, and cause such identified memory pages to be transferred first as part of the live migration of the VM 110a. In one example, read-only memory and executables may include the kernel memory and kernel code that are defined as read-only for security and protection measures, and thus do not change (become "dirty") during the live migration process. As such, these read-only and executable memory pages are good candidates for transferring first (i.e., in a first iteration) as part of the live migration process. Transferring memory pages with the lowest likelihood of becoming dirty during the migration process lowers the chances of having to re-transfer a dirtied memory page during the live migration process (which lengthens the live migration process and expends additional processing time and resources due to re-transfer of the dirtied memory page).

Once the first iteration of the memory page transfer described above is completed, the page order component 122 proceeds to a second iteration of the memory page transfer of the VM 110a. The second iteration includes the page order component 122 communicating with a VM agent 112 of the VM 110a. The VM agent 112 may be a process that executes within the VM 110a to allow the source host 101a and the source hypervisor 115a to issue commands to the guest OS of the VM 110a. The VM agent 112 can be deployed to help virtualization tools run more optimally in the virtualization system 100. In addition, the VM agent 112 can facilitate communication between the VM 110a and the source hypervisor 115a.

In one implementation, the page order component 122 may communicate with the VM agent 112 to inform the VM agent 112 of the live migration of the VM 110a. In response, the VM agent 112 may provide indications (e.g., hints, memory page identifiers, etc.) of memory pages of the VM 110a to prioritize for transfer during the live migration. Furthermore, the VM agent 112 may provide indications of memory pages of the VM 110a to ignore or de-prioritize for transfer during the live migration.

In one implementation, the VM agent may provide a first indication of prioritized memory pages, a second indication of de-prioritized memory pages, and a third indication of ignored memory pages. To determine which memory pages to indicate as prioritized or de-prioritized, the VM agent 112 may identify memory pages of the VM that are likely to be associated with dynamic data (i.e., data that is likely to be updated during execution of the VM) and memory pages of the VM that are likely to be associated with static data (i.e., data likely to remain the same during execution of the VM). For example, the VM agent 112 is aware of which applications are being executed by the VM 110a, and thus the running application's corresponding memory pages (e.g., address space) may be considered as having dynamic data. The VM agent 112 can then identify to the page order component 122 the memory pages of the VM 110a associated with these running applications. These memory pages associated with dynamic data (of the running applications) would be indicated for de-prioritization to the page order component 122, as these memory pages have a high likelihood of changing and would not be good candidates for transfer until later in the VM memory page transfer process of the live migration. In another example, the VM agent 112 may identify, to the page order component 122, lower-layer memory pages (e.g., associated with a boot process and/or kernel) of the VM 110a as having static data (less likely to change) and, therefore, as prioritized for transfer as part of the live migration.

To determine which memory pages to indicated as ignored, the VM agent 112 may implement memory reclamation techniques, such a virtual memory ballooning and cache optimization. In one implementation, in response to determining that a live migration of the VM is occurring, the VM agent 112 initiates a virtual memory ballooning process to free memory space of the VM 110a. Virtual memory ballooning refers to a computer memory reclamation technique to retrieve unused memory from a VM to be shared with other VMs. If a VM (e.g., VM 110a) uses a portion of memory that was allocated to the VM, the virtual memory ballooning technique makes it available for the host machine (e.g., source host 101a) to use. For example, if each of the VMs on a host machine are allocated 8 GB of memory, some of the VMs may use half the allotted share. Meanwhile, one VM might request 12 GB of memory for an intensive process. Memory ballooning allows the host machine to borrow that unused memory and allocate it those VMs with higher memory demand. The host machine uses balloon drivers running on the VMs to determine how much memory it can take back from an under-utilizing VM. Balloon drivers should be installed on any VM that participates in the memory ballooning technique. Balloon drivers obtain the target balloon size from the hypervisor and then inflate the balloon by allocating the prior number of guest physical pages within the VM. This process is known as inflating the balloon.

In implementations of the disclosure, VM agent 112 may utilize a balloon driver (not shown) on VM 110a for a virtual memory ballooning device 150 of the source host 101a. The VM agent 112 may use the balloon driver to inflate the balloon in the VM 110a in order to free memory pages of the VM. The VM agent 112 may then identify those memory pages that have been freed to the page order component 122. In particular, the VM agent 112 may indicate that the freed memory pages from the virtual memory ballooning in VM 110a should be ignored for purposes of memory page transfer for live migration of the VM 110a.

In some implementations, the VM agent 112 may allow the balloon driver to inflate to a point where the VM 110a no longer has enough memory to run its processes within itself. As a result, the VM 110a may utilize VM memory swapping to "swap" memory pages to and from disk. VM memory swapping causes the VM to slow down, which in turn reduces the rate of memory page "dirtying" that occurs on the VM. Reducing the rate of memory page "dirtying" may have an advantageous effect of increasing live migration speed (as pages are dirtied less quickly and re-copying of dirtied pages thereby decreases).

In some implementations, in response to determining that a live migration of the VM is occurring, the VM agent 112 may also enhance the memory page transfer of the live migration of the VM 110a by optimizing page cache usage of the VM 110a. The page cache (or cache) of the VM 110a is a small portion of memory on or close to the VM CPU 130a that can operate faster than the main memory of the VM 110a. A cache component (not shown) of the CPU 130a may manage the cache. To optimize the cache usage of the VM 110 during the live migration process, the VM agent 112 may proceed with a two-pronged approach. First, the VM agent 112 cleans up (i.e., flush, sync) the cache of the VM 110a. In one implementation, the VM agent 112 may cause the VM 110a to issue an "fsync" command to synchronize data in the cache of the VM 110 to disk in order to reduce "dirty" cache memory in the VM 110a. In one implementation, these synchronized portions of cache can be identified to the page order component 122 as portions of memory that can be ignored for page transfer purposes during the live migration.

Second, the VM agent 112 may reduce the size of the cache so that there is less memory that is directed by the cache component of the VM 110a. For example, the VM agent 112 may cause the VM 110a to issue a command to reduce the cache size of the VM 110a to a nominal or zero portion of memory of the VM 110a (e.g., "vm.dirty_background_ratio=0"). In one implementation, these freed portions of cache can be identified to the page order component 122 as portions of memory that can be ignored for memory page transfer purposes during the live migration.

Optimizing the cache usage of the VM 110a as described above frees VM memory that does not have to be transferred during the live migration process of the VM 110a, reduces/restricts (or eliminates) the amount of memory that could potentially be "dirtied" during the live migration process, and slows down operation of the VM 110a (as VM 110a may have to read from disk). These results may allow the live migration process of the VM 110a to be faster and more efficient.

Once the VM agent 112 provides the indications of memory pages to prioritize, de-prioritize, or ignore, the page order component 122 transfers the prioritized memory pages of the VM as part of the second iteration of the VM memory page transfer of the live migration. As part of a third iteration of the VM memory page transfer of the live migration, the page order component 122 causes all remaining memory pages that have not yet been transferred to be transferred in the live migration, with the indicated de-prioritized memory pages to be transferred last in this group.

Once the memory page transfer phase of the live migration is complete, source migration agent 120a can initiate a stop-and-copy-phase by stopping the VM 110a and copying any dirty memory pages to the destination host 101b. Dirty memory pages refer to memory pages that were changed by the VM 110a after the initial copying of the memory of the VM 110a to the destination host 101b. Implementations of the disclosure of utilizing an intelligent page order for memory page transfer should reduce the number of dirtied memory pages encountered during the stop-and-copy phase. Migration manager 127 can receive a notification when the stop-and-copy-phase is successful and can inform the source migration agent 120a to begin a post-copy memory migration stage.

In the post-copy memory migration stage, the source migration agent 120a can issue a command to suspend the VM 110a at the source host 101a. When the VM 110a is suspended, the source migration agent 120a can transmit a minimal execution state of the source VM 110a (e.g., CPU, registers, a state of devices accessible to virtual machine 110a, non-pageable memory) to the destination host 101b.

The "source" and "destination" designations for the, hosts, hypervisors and migration agents are provided for reference purposes in illustrating an implementation of the migration process according to implementations. It can be further appreciated that depending on the particulars of a given migration event, a hypervisor may at one time serve as the source hypervisor, while at another time the hypervisor may serve as the destination hypervisor.

Figure 2:
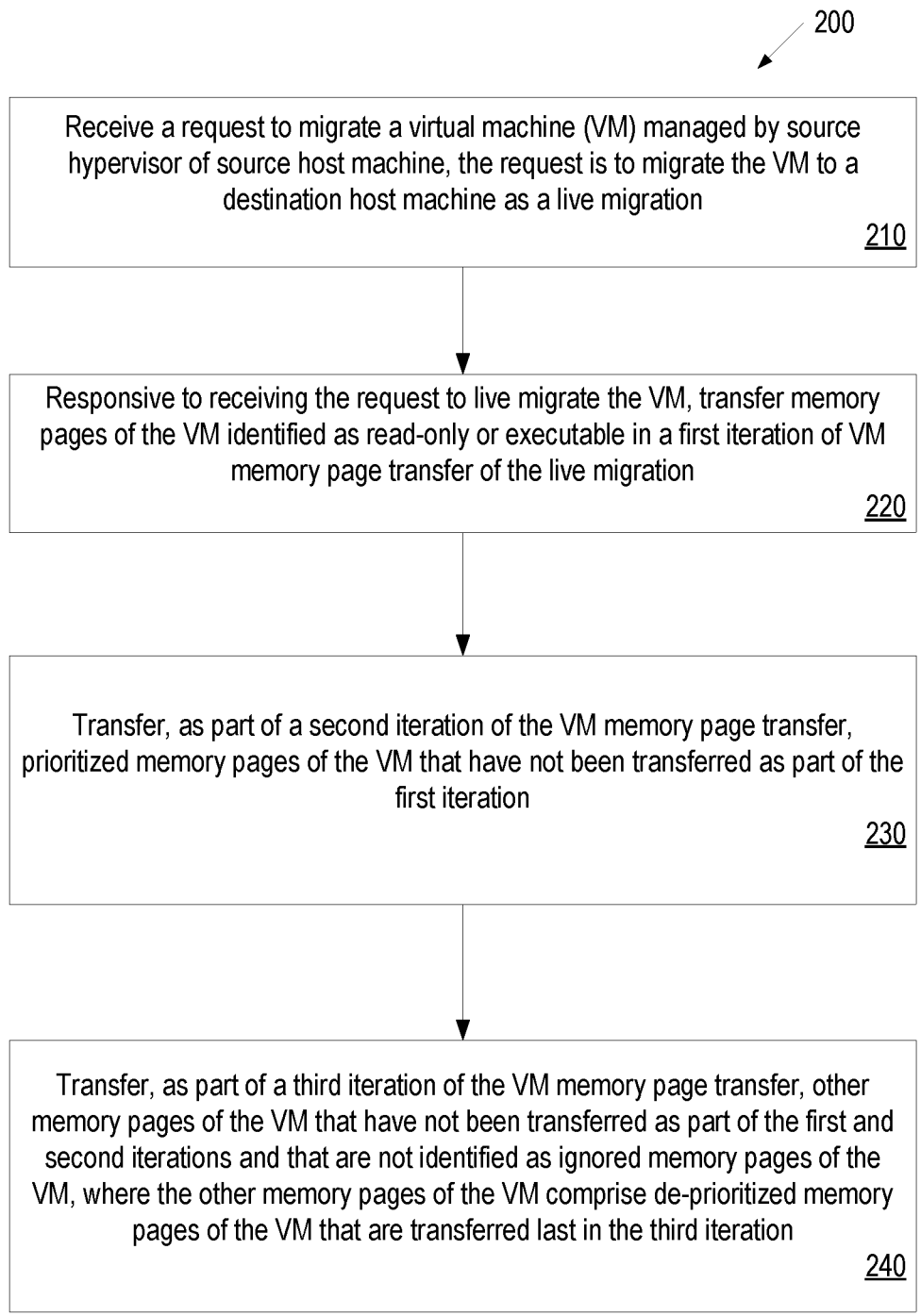
FIG. 2 depicts a flow diagram of a method for virtual machine live migration using intelligent order of pages to transfer, in accordance with one or more aspects of the disclosure.

FIG. 2 depicts a flow diagram for illustrative example of a method 200 for providing VM live migration using intelligent order of pages to transfer, according to implementations of the disclosure. Method 200 may be performed by processing devices that may comprise hardware (e.g., circuitry, dedicated logic), computer readable instructions (e.g., run on a general purpose computer system or a dedicated machine), or a combination of both. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a page order component, such as page order component 122 as shown in FIG. 1.

Referring to FIG. 2, method 200 may be performed by processing devices of a computing device and may begin at block 210. At block 210, a processing device may receive a request to migrate a virtual machine (VM) managed by source hypervisor of source host machine, the request to migrate the VM to a destination host machine as a live migration. At block 220, the processing device may, responsive to receiving the request to live migrate the VM, transfer memory pages of the VM identified as read-only or executable in a first iteration of VM memory page transfer of the live migration. Subsequently, at block 230, the processing device may transfer, as part of a second iteration of the VM memory page transfer, prioritized memory pages of the VM that have not been transferred as part of the first iteration. Lastly, at block 240, the processing device may transfer, as part of a third iteration of the VM memory page transfer, other memory pages of the VM that have not been transferred as part of the first and second iterations and that are not identified as ignored memory pages of the VM, where the other memory pages of the VM comprise de-prioritized memory pages of the VM that are transferred last in the third iteration.

Figure 3:
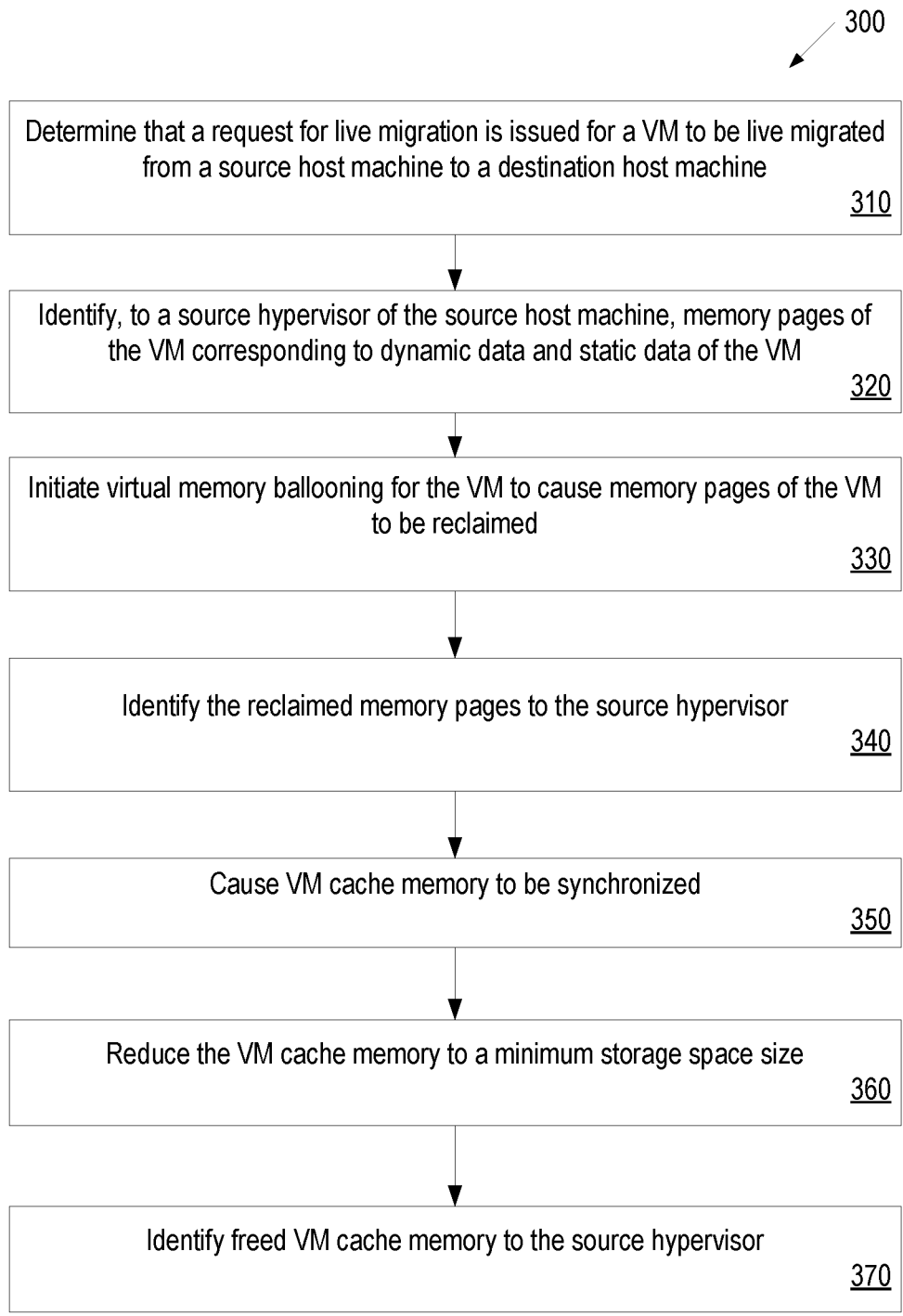
FIG. 3 depicts a flow diagram of another method for virtual machine live migration using intelligent order of pages to transfer, in accordance with one or more aspects of the disclosure.

FIG. 3 depicts a flow diagram for illustrative example of another method 300 for VM live migration using intelligent order of pages to transfer, according to implementations of the disclosure. Method 300 may be performed by processing devices that may comprise hardware (e.g., circuitry, dedicated logic), computer readable instructions (e.g., run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In one implementation, method 300 may be performed by a VM agent, such as VM agent 112 as shown in FIG. 1.

Referring to FIG. 3, method 300 may be performed by processing devices of a computing device and may begin at block 310. At block 310, a processing device may determine that a request for live migration is issued for a VM to be live migrated from a source host to a destination host. At block 320, the processing device may identify, to source hypervisor of source host, memory pages of the VM corresponding to dynamic data and static data of the VM. At block 330, the processing device may initiate virtual memory ballooning for the VM to cause memory pages of the VM to be reclaimed. Subsequently, at block 340, the processing device may identify the reclaimed memory pages to the source hypervisor.

At block 350, the processing device may cause VM cache memory to be synchronized. At block 360, the processing device may reduce the VM cache memory to a minimum storage space size. Lastly, at block 370, the processing device may identify freed VM cache memory to the source hypervisor.

Figure 4:
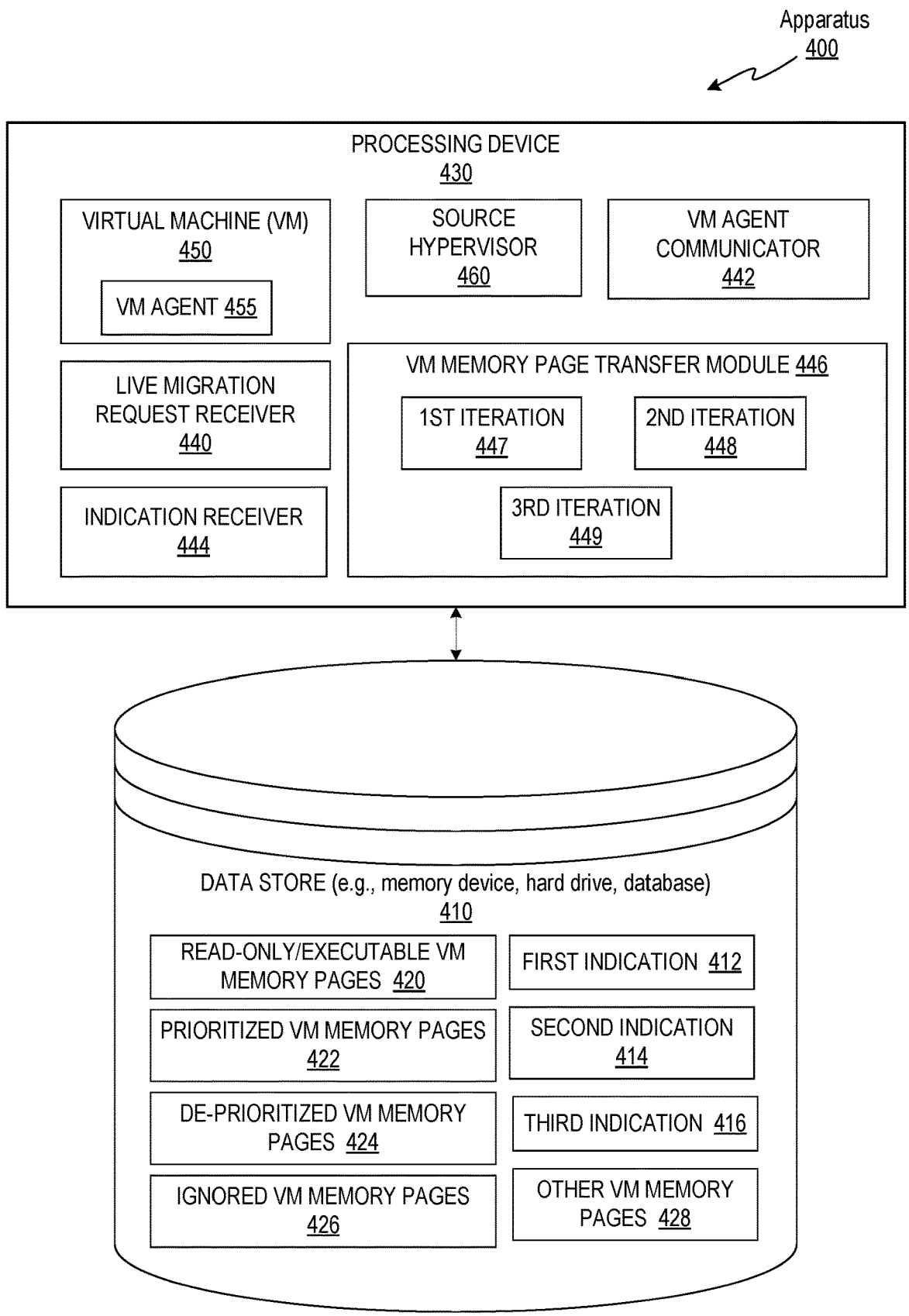
FIG. 4 illustrates an example apparatus in which implementations of the disclosure may operate.

FIG. 4 illustrates an example apparatus 400 in which implementations of the disclosure may operate. The apparatus 400 may be the same or similar to one of the source host 101a, destination host 101b (FIG. 1), or other computing device within the networked virtualization architecture 100. Apparatus 400 may include components and modules for VM live migration using intelligent order of pages to transfer. The apparatus 400 may include a data store 410 that can store read-only/executable VM memory pages 420, prioritized VM memory pages 422, de-prioritized VM memory pages 424, ignored VM memory pages 426, and other VM memory pages 428. The data store 410 may include any non-persistent data storage (e.g., memory), persistent data storage (e.g., flash storage, hard drive, tape), other medium, or combination thereof that is capable of storing instructions for carrying out the operations of the components and module discussed herein. The apparatus 400 may include components and modules for VM live migration using intelligent order of pages to transfer. The apparatus 400 may include a processing device 430 with a live migration request receiver 440, a VM agent communicator 442, an indication receiver 444, a VM memory page transfer module 446, a VM 450, and a source hypervisor 460.

The live migration request receiver 440 can receive a request to live migrate the VM 450 managed by the source hypervisor 460 of the apparatus 400 (such as a source host machine), where the request is to live migrate the VM 450 to a destination host machine. The VM agent communicator may communicate with a VM agent 455 of the VM 450 to inform the VM agent 455 of the request to live migrate the VM 450. The indication receiver 444 may receive, from the VM agent 455, a first indication 412 of prioritized memory pages 422 of the VM 450, a second indication 414 of de-prioritized memory pages 424 of the VM 450, and a third indication 416 of ignored memory pages 426 of the VM 450.

The VM memory page transfer module 446 may transfer, as part of a first iteration 447 of a VM memory page transfer of the live migration, memory pages 420 of the VM 450 identified as at least one of read-only or executable. The VM memory page transfer module 446 may also transfer, as part of a second iteration 448 of the VM memory page transfer, the prioritized memory pages 422 of the first indication 412 that have not been transferred as part of the first iteration 447. Furthermore, the VM memory page transfer module 446 may transfer, as part of a third iteration 449 of the VM memory page transfer, other memory pages 428 of the VM 450 that have not been transferred as part of the first 447 and second 448 iterations and that are not identified as ignored memory pages 426 of the third indication 416, wherein the de-prioritized memory pages 424 of the second indication 414 are transferred last in the third iteration 449.

Figure 5:
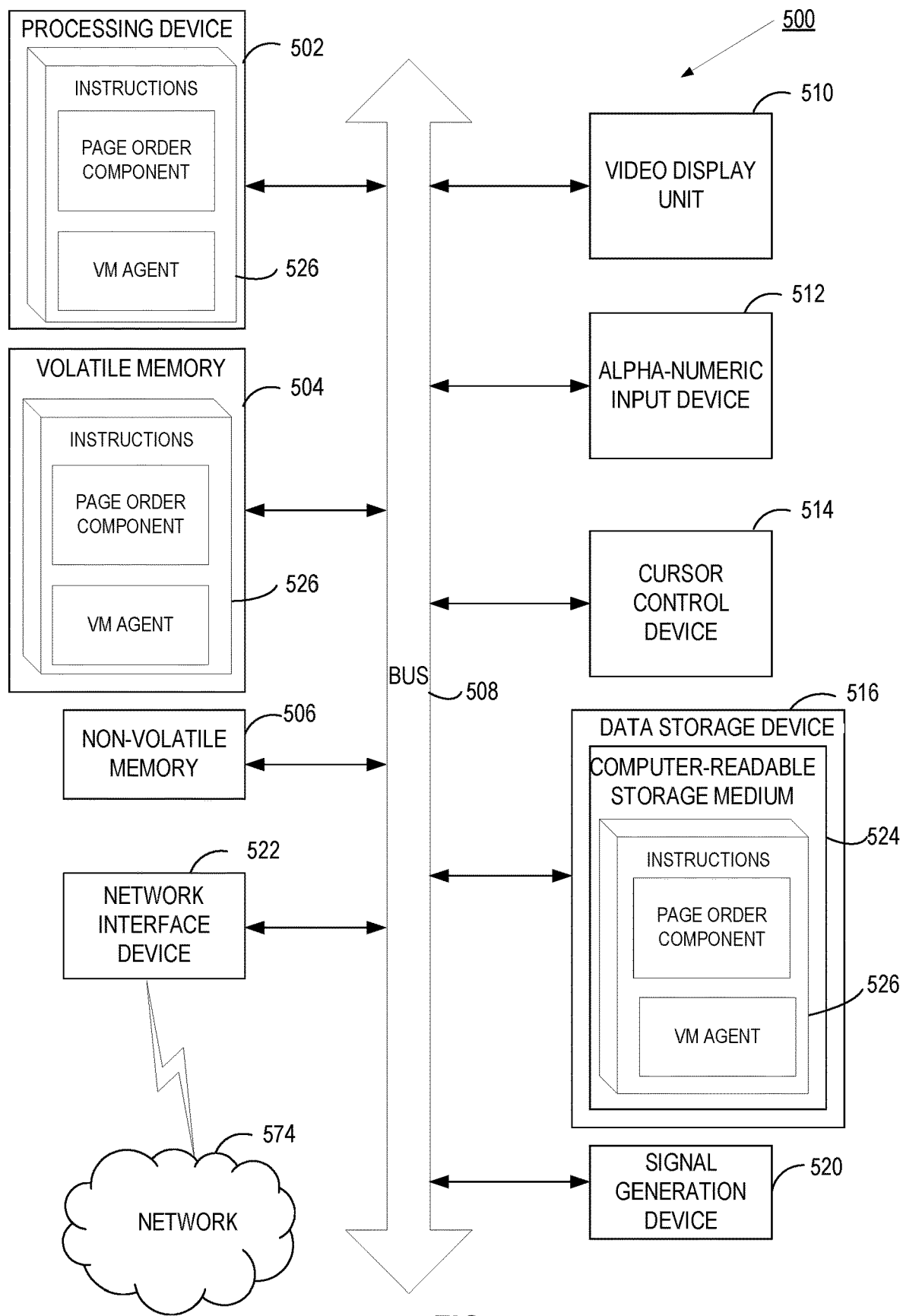
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to a computing device, such as source host machine 101a or destination host machine 101b of FIG. 1. The computer system may be included within a data center that supports virtualization. Virtualization within a data center results in a physical system being virtualized using virtual machines to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for a page order component 122 or VM agent 112 of FIG. 1 for implementing methods 200 or 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "identifying," "updating," "saving," "determining," "transmitting," "invoking," "associating," "providing," "storing," "performing," "utilizing," "deleting," "initiating," "marking," "generating," "recovering," "completing," "transferring," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200 and 200 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
    receiving a request to migrate a virtual machine (VM) managed by a source hypervisor of a source host machine, wherein the request is to migrate the VM to a destination host machine as a live migration;
    receiving, from a VM agent of the VM, indications regarding status of memory pages of the VM for transfer during the live migration, wherein the indications comprise a first indication of prioritized memory pages of the VM, a second indication of de-prioritized memory pages of the VM, and a third indication of ignored memory pages of the VM, wherein the ignored memory pages of the third indication comprise freed memory pages resulting from at least one of VM memory ballooning or cache optimization of the VM;

responsive to receiving the request to live migrate the VM and to receiving the indications regarding the status of the memory pages of the VM, transferring, by a processing device of the source host machine, memory pages of the VM that are identified as at least one of read-only or executable in a first iteration of VM memory page transfer of the live migration;

transferring, by the processing device as part of a second iteration of the VM memory page transfer and in view of the received indications, prioritized memory pages of the VM that have not been transferred as part of the first iteration, the prioritized memory pages identified in accordance with the first indication of the received indications; and transferring, by the processing device as part of a third iteration of the VM memory page transfer and in view of the second indication and the third indication of the received indications, other memory pages of the VM that have not been transferred as part of the first and second iterations and that are not identified in view of the third indication as ignored memory pages of the VM, wherein the other memory pages of the VM comprise de-prioritized memory pages of the VM identified in accordance with the second indication that are transferred last in the third iteration.

2. The method of claim 1, wherein the VM agent of the VM comprises an executable process of the VM to allow the source host machine and the source hypervisor to issue commands to a guest operating system of the VM and to facilitate communication between the VM and the source hypervisor.

3. The method of claim 1, wherein the prioritized memory pages of the first indication comprise static data memory pages.

4. The method of claim 1, wherein the de-prioritized memory pages of the second indication comprise dynamic data memory pages.

5. The method of claim 1, wherein the VM memory ballooning comprises memory reclamation performed by a VM ballooning device to retrieve and free unused memory pages from the VM.

6. The method of claim 1, wherein the cache optimization comprises:
synchronizing cache memory of the VM to disk memory of the VM; and
reducing a size of the cache memory of the VM.

7. The method of claim 1, wherein a memory page data structure of the source host machine comprises entries for the memory pages of the VM, each of the entries to indicate whether a corresponding memory page of the VM is at least one of read-only or executable.

8. A non-transitory machine-readable storage medium storing instructions that cause a processing device to:
determine that request for live migration is issued for a virtual machine (VM) to be live migrated from a source host machine to a destination host machine, the VM executed by the processing device on the source host machine;
receive, from a VM agent of the VM, indications regarding status of memory pages of the VM for transfer during the live migration, wherein the indications comprise a first indication of prioritized memory pages of the VM, a second indication of de-prioritized memory pages of the VM, and a third indication of ignored memory pages of the VM, wherein the ignored memory pages of the third indication comprise freed memory pages resulting from at least one of VM memory ballooning or cache optimization of the VM;

responsive to determining that the request for live migration is issued and to receiving the indications regarding the status of the memory pages of the VM, identify, to a source hypervisor of the source host machine, memory pages of the VM corresponding to dynamic data and static data of the VM based on the first indication and the second indication of the received indications;

initiate virtual memory ballooning for the VM to cause at least a subset of the memory pages of the VM to be reclaimed;

identify the reclaimed memory pages to the source hypervisor;

cause VM cache memory to be synchronized;

reduce the VM cache memory to a minimum storage space size; and identify freed VM cache memory pages to the source hypervisor.

9. The non-transitory machine-readable storage medium of claim 8, wherein the dynamic data comprises data corresponding to an executing application of the VM, and wherein the
memory pages identified as dynamic data are indicated to the source hypervisor as de-prioritized in accordance with the second indication of the received indications in a VM memory page transfer of the live migration of the VM.

10. The non-transitory machine-readable storage medium of claim 8, wherein the static data comprises data corresponding to low-level memory of the VM, and wherein the memory pages identified as static data are indicated to the source hypervisor as prioritized in accordance with the first indication of the received indications in a VM memory page transfer of the live migration of the VM.

11. The non-transitory machine-readable storage medium of claim 8, wherein the reclaimed memory pages are identified to the source hypervisor as memory pages to ignore in accordance with the third indication of the received indications as part of a VM memory page transfer of the live migration of the VM.

12. The non-transitory machine-readable storage medium of claim 8, wherein the minimum storage space size is zero.

13. The non-transitory machine-readable storage medium of claim 8, wherein the freed cache memory pages are identified to the source hypervisor as memory pages to ignore as part of a VM memory page transfer of the live migration of the VM.

14. A system comprising,
a memory; and
a processing device operatively coupled to the memory, the processing device to:
receive a request to migrate a virtual machine (VM) managed by a source hypervisor of a source host machine, wherein the request is to migrate the VM to a destination host machine as a live migration;
communicate with a VM agent of the VM to inform the VM agent of the request to live migrate the VM;
receive, from the VM agent, indications regarding status of memory pages of the VM for transfer during the live migration, wherein the indications comprise a first indication of prioritized memory pages of the VM, a second indication of de-prioritized memory pages of the VM, and a third indication of ignored memory pages of the VM, wherein the ignored memory pages of the third indication comprise freed memory pages resulting from at least one of VM memory ballooning or cache optimization of the VM;

responsive to receiving the request to live migrate the VM and to receiving the first indication, the second indication, and the third indications, transfer, as part of a first iteration of a VM memory page transfer of the live migration, memory pages of the VM identified as at least one of read-only or executable;

transfer, as part of a second iteration of the VM memory page transfer and in view of the first indication, the prioritized memory pages of the first indication that have not been transferred as part of the first iteration, wherein the prioritized memory pages identified in accordance with the first indication of the received indications; and transfer, as part of a third iteration of the VM memory page transfer and in view of the second and third indications, other memory pages of the VM that have not been transferred as part of the first and second iterations and that are not identified as the ignored memory pages of the third indication, wherein the de-prioritized memory pages of the second indication are transferred last in the third iteration.

15. The system of claim 14, wherein the indications of memory pages comprise address ranges of the memory pages.

16. The system of claim 14, wherein the prioritized memory pages of the first indication comprise static data memory pages.

17. The system of claim 14, wherein the de-prioritized memory pages of the second indication comprise dynamic data memory pages.

* * * * *